United States Patent [19]

Fey

[11] Patent Number: 4,847,928
[45] Date of Patent: Jul. 18, 1989

[54] MOTOR VEHICLES EQUIPPED FOR DECONTAMINATION PURPOSES

[75] Inventor: Hans Fey, Hasselroth, Fed. Rep. of Germany

[73] Assignee: Matra-Werke GmbH, Frankfurt/M, Fed. Rep. of Germany

[21] Appl. No.: 36,787

[22] Filed: Apr. 10, 1987

[30] Foreign Application Priority Data

Apr. 10, 1986 [DE] Fed. Rep. of Germany ....... 3612130

[51] Int. Cl.$^4$ .......... B60R 15/00; B60P 3/00; A62D 3/00
[52] U.S. Cl. .......... 4/661; 4/596; 4/663; 239/172; 296/37.6
[58] Field of Search ............ 4/663, 661, 662, 664, 4/596; 422/1, 28, 121, 122, 292; 222/608, 626; 15/302, 53 R, 310; 239/172; 137/899; 296/37.6

[56] References Cited

U.S. PATENT DOCUMENTS

| | | | |
|---|---|---|---|
| 2,878,617 | 3/1959 | Finn | 239/172 X |
| 3,586,236 | 6/1971 | Schaffler | 239/172 |
| 3,594,825 | 7/1971 | Reid | 4/663 |
| 3,739,791 | 6/1973 | Fry et al. | 422/28 |
| 3,742,520 | 7/1973 | Bernandi | 4/662 |
| 3,770,060 | 11/1973 | Forsyth et al. | 239/172 |
| 3,771,605 | 11/1973 | Alberti | 239/172 |
| 3,902,667 | 9/1975 | Jackson | 137/899 X |
| 4,211,745 | 7/1980 | Boyd | 422/28 |
| 4,430,028 | 2/1984 | Clayton et al. | 137/899 X |
| 4,678,041 | 7/1987 | Staudinger | 239/172 |

*Primary Examiner*—Daniel P. Stodola
*Assistant Examiner*—Steven M. duBois
*Attorney, Agent, or Firm*—Thomas R. Shaffer

[57] ABSTRACT

A motor vehicle for the decontamination of terrain and equipment and of personnel with at least one chemical dispersing device and spraying devices on the vehicle is provided having a module box placed on the vehicle frame in which the means for terrain and equipment decontamination are located, and a second module box placed on the vehicle frame and removable from it in a well known manner onto the ground, in which all the equipment required for the decontamination of personnel are located, and two tents can be built onto it and a shower arrangement is located on its rear side.

11 Claims, 4 Drawing Sheets

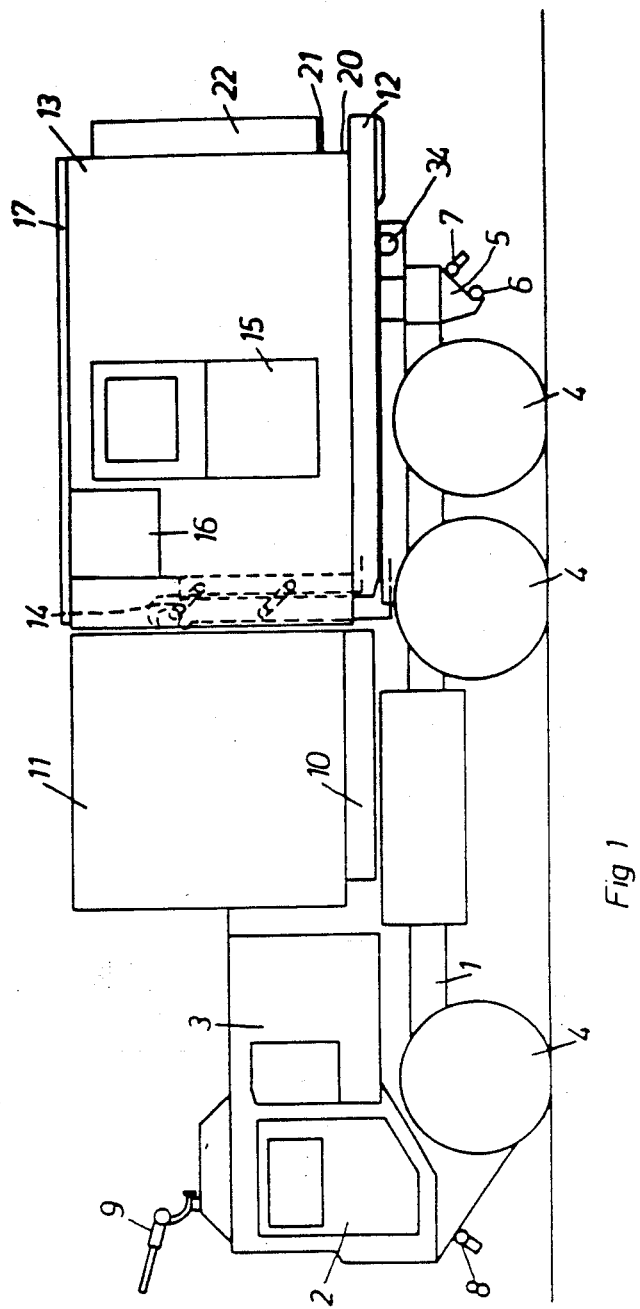

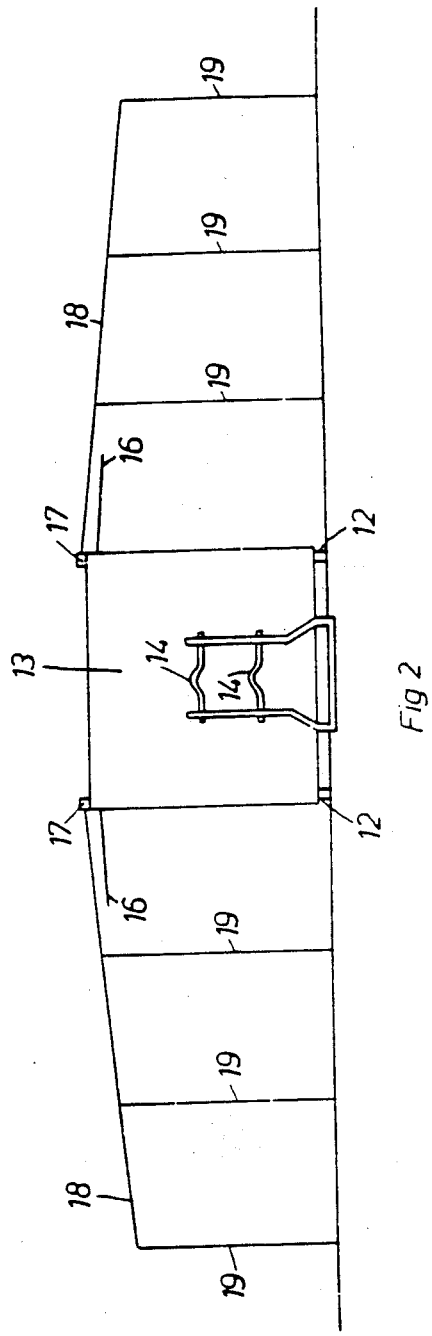

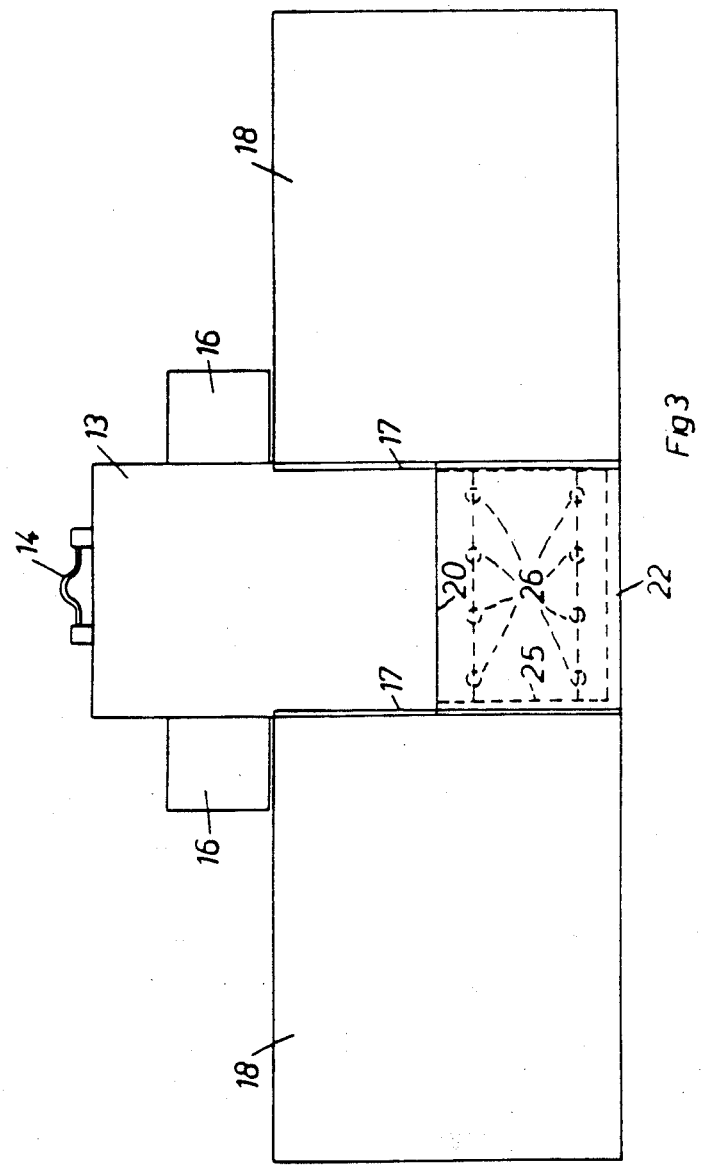

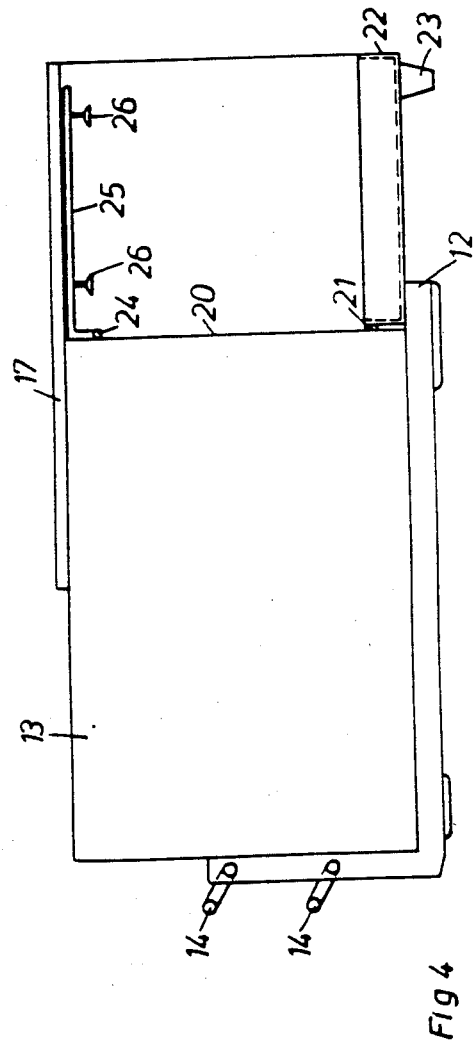

MOTOR VEHICLES EQUIPPED FOR DECONTAMINATION PURPOSES

This invention relates to motor vehicles equipped for decontamination purposes and more particularly to a motor vehicle that is provided with special equipment for decontamination purposes, where at least one dispersing apparatus and/or one spraying apparatus and additional equipment for decontaminating the terrain or equipment that are positioned at a specific site during the decontamination and equipment for decontaminating personnel are provided on the vehicle. The invention thus also concerns a transportable, loadable apparatus for decontamination and/or concerns a special assembly for a motor vehicle that is used for the purpose of decontamination. In the familiar vehicles of this type, rigid dispersing apparatuses for chemicals, e.g., chloride of lime, and/or spraying apparatuses for water or chemicals are provided, in which case these devices serve to wet the terrain over which the vehicle is traveling with the chemicals and water used for the decontamination. The provision of water tanks and containers for chemicals on the vehicle as well as the provision of fastening devices for such containers and possibly the provision of pumps and coilable hoses that are used to spray the shutdown apparatuses with chemicals are also known. A cabinet designed as a tent is known for cleaning the surface of the human body. Showers are provided in it, where a water collecting trough is formed in the floor area of a flexible foil, the upper edge of which is laid around approximately horizontal tent poles; this prevents the polluted water used in the showers from running off into the soil. The providing of auxiliary tents for undressing and dressing is also known (DE-OS No. 24 49 119). The setting up and taking down of these tents are quite time-consuming. Water tanks, containers for soap and chemicals and equipment for heating the showering water must be set up separately alongside the tent and connected to the showers and the water collecting trough. This requires additional time expenditure in setting up and taking down.

A beginning of decontamination that is delayed by the time-consuming set up of the showering equipment has an adverse effect on its effectiveness.

The invention proposes to improve the possiblity and conditions of utilizing a motor vehicle or a motor vehicle setup.

This goal is achieved by having a motor vehicle with at least one spraying and/or dispersing device fastened to the vehicle and additional apparatus for the decontamination of contaminants which are stationary, at least during the decontamination process and equipment for the decontamination of personnel and in which:

(a) all the additional equipment for the decontamination of stationary components, apart from the dispersing and/or spraying equipment fastened to the vehicle, are combined in a first module box;

(b) all the equipment for personnel decontamination are located in a second module box separate from the first box;

(c) the second module box is removable by a conventional known means due to the fact that a module box is provided that contains all the storage containers and apparatuses for decontaminating the terrain and equipment, insofar as they are not fastened to the vehicle, and a second module box is also provided on the same vehicle frame detachably, the apparatuses for decontaminating the terrain and the equipment on the one hand and for decontaminating personnel on the other are independent of each other. In particular, the module box with the equipment for personnel decontamination can be placed on the ground and then be used independently of the vehicle, while the vehicle with all the equipment for decontamination of the terrain and equipment is ready for use at any time independently of the equipment for personnel decontamination. That is, both systems, namely the terrain and equipment decontamination and the personnel decontamination, are thus autonomous and can be used quite independently of each other.

In an expedient embodiment the module box that contains the apparatus for terrain decontamination is also detachable, or preferably parts of this module or the components incorporated into it are removable and detachable. These components can be designed as slide-in containers provided with hand carriers and which can be fastened in the module, or as trucks removable from it. If the module is detached as a whole or, preferably, if the individual components are removed from the module, the vehicle itself can be used for decontaminating a strip of ground so long as the supplies of water and chemicals hold out, while the detached and used module boxes or the partial set, removed from it, of equipment that is placed nearby or are slowly passed by can be decontaminated or the reservoirs in this module or the components removed can be replenished or maintenance work can be undertaken on these components, e.g., pumps. If both modules are installed on the vehicle, they can be transported quite rapidly over long stretches, such that a complete system that can be used for decontaminating the terrain, equipment or even personnel can be rapidly brought to any site of application. However, it is preferable if the first module is solidly fastened to the vehicle.

In the foregoing general description of the invention I have set out certain objects, purposes and advantages of the invention. Other objects, purposes and advantages will be apparent from a consideration of the following description and the accompanying drawings in which:

FIG. 1 shows a side view of the vehicle with two module boxes in place for personnel decontamination and terrain and equipment decontamination;

FIG. 2 shows a front view of the removed module for personnel decontamination;

FIG. 3 shows a top view of the equipment according to FIG. 2;

FIG. 4 shows a side view of the removed module for personnel decontamination with the shower apparatus extended; and FIG. 5 shows the rear section of the module according to FIG. 2 with the shower apparatus collapsed for transport.

The vehicle has a frame 1, a cab 2, an engine and operating equipment compartment 3 and six wheels 4. A dispersing device for chemicals with a funnel box 5 and a sprinkling device 6 is provided at the rear end of the frame 1 and a liquid spraying apparatus 7 is provided above them. An additional liquid spraying apparatus 8 is provided at the front end of the vehicle. A foam spray monitor 9 is located on the roof of the cab 2.

A container-like vehicle module reservoir 11 is installed on the vehicle frame 1 by means of an intermediate frame 10. A water tank, fastening devices for chemical tanks, pump equipment, hoses and other accessories are provided in its interior. Closure valves, doors and the like (not shown) are provided on the module box 11; they make it possible to enter the module box 11 or to get at the reservoir tanks located in it. Plug-in ladders or movable ladders are provided on the vehicle in a familiar manner; they make it possible to get from the roadway level to the doors of the box 11 quite readily and to remove chemicals for example and bring them into the feed funnel 5. Hose connections, by which the pipelines running in the vehicle frame 1 are connected with the spray devices 7 and 8 are provided on the module box 11 (they are not shown in the drawing).

An additinal intermediate frame 12, on which a second module box 13 is placed, is located on the vehicle frame 1. On its front side, this module box 13 has connection means 14, which are provided for connection with the devices that serve to lift or pull the module box 13 on the vehicle frame 1. A roller 34 can serve to move the intermediate frame 12 on the vehicle frame 1.

The module box has a door 15 and a swing-up projection roof 16 on each side. A roller loading box 17 is fastened on the roof surface; it is fastened in the embodiment example shown in the drawing so that it can be shoved rearward for operating the personnel decontamination apparatus.

A roof surface 18 can be pulled out in the manner of an awning from each of the two roller loading boxes 17; it can be supported by means of the tent poles 19. Vertically hanging tent tarpaulins (not shown) can be suspended along the outer edge of the roof surface 18 so that a tent-like closed space results under each of the two roof surfaces 18, one of which is used for undressing and the other for dressing. A roof surface that is extensible toward both sides in the manner of an awning from a single roller loading box can also be provided in another embodiment.

A shower water collecting trough 22 is supported in a swing-up manner on the rear surface 20 of the module box 13 by means of a flexible coupling 21; in the swung-down state shown in FIG. 4 it can be supported on the ground by means of the support legs 23, but it also rests on an overhanging part of the intermediate frame 12. A pipe 25 to which the shower heads 26 are fastened, is connected by the articulated pipe connections 24 with a pipeline located in the module box 13 (not shown). The pipeline 25 and thus the showers 26 are loaded with water through valves that are located in the box 13, but are not shown in the drawing. Water tanks, at least one pump, possibly water heating equipment and the like are also provided in the box 13. The pipe 25 with the showers 26 is shown in FIG. 4 in the swung-up state for operation.

It can be seen in FIG. 5 that the pipe 25 with the shower heads 26 can be swung down and then it lies against the rear wall 20 of the box 13 such that the shower water collecting trough 22 covers and protects the pipe 25 with the shower heads 26.

The roller loading boxes can also be retracted into the box 13 located under the roof surface.

In the foregoing specification I have set out certain preferred practices and embodiments of this invention, however, it will be understood that this invention may be otherwise embodied within the scope of the following claims.

I claim:

1. A motor vehicle equipped for decontamination purposes containing at least one independent dispensing device fastened to the vehicle for dispensing water and decontamination fluids over an area, a first container-like module for decontamination of stationary equipment on said vehicle, said module including the equipment necessary for decontamination of stationary equipment, a second container-like module on said vehicle adjacent the first module, said second module including the equipment for personal decontamination, each of said first module and said second having entry means to allow for access to equipment therein, said second module being selectively removable from and replaceable on said vehicle and means on said vehicle, including connection means to allow for connection to a lifting device and roller means, for facilitating the removal from and replacement of said second module on said vehicle.

2. Motor vehicle according to claim 1, wherein decontamination components can be inserted into the first module box and can be removably secured in it, and are separately transportable and contain chemicals or equipment including pumps for the decontamination of equipment that is adjacent to said first module during the decontamination process.

3. Motor vehicle according to claim 1, wherein the first module box is detachable from the vehicle, is preferably removable together with the second module box.

4. A motor vehicle as claimed in claim 3 wherein the first module is removable with said second module.

5. A motor vehicle equipped for decontamination purposes containing at least one dispensing device fastened to the vehicle for dispensing water and decontamination fluids over an area, a first module for decontamination of stationary equipment on said vehicle, said module including all equipment necessary for decontamination of stationary equipment and a second module on said vehicle adjacent said the first module, said second module including all equipment for personal decontamination, said second module being selectively removable from and replaceable on said vehicle, wherein the second module for decontamination of personnel is a closed element for transports, a water pipe with shower heads is pivotally mounted on the rear of said module adjacent the top for movement from a generally horizontal position to a down position, a shower water collecting trough is pivotally mounted to move from a lower position to a generally vertical position over said pipe and shower heads in their down position, a first retractable roof member is provided on one side of said second module adapter to form a roof surface of an undressing room on one side of said module and a second retractable roof member is provided on the other side of said second module adapted to form a roof surface of a dressing room on the other side of said module.

6. Motor vehicle according to claim 5, wherein decontamination components can be inserted into the first module box and can be removably secured in it, and are separately transportable and contain chemicals or equipment including pumps for the decontamination of equipment that is adjacent to said first module during the decontamination process.

7. Motor vehicle according to claim 5, wherein the first module box is detachable from the vehicle.

8. A motor vehicle as claimed in claim 7 wherein the first module is removable with said second module.

9. A motor vehicle as claimed in claim 5 or 6, or 7 or 8 wherein the first and second retractable members are fabric rolled on a retracting roller in the second module.

10. A motor vehicle as claimed in claim 9, wherein the retracting roller is mounted in a roller loading box.

11. A motor vehicle as claimed in claim 10 wherein the roller loading box is displaceably in the longitudinal direction of the vehicle.

* * * * *

UNITED STATES PATENT AND TRADEMARK OFFICE
CERTIFICATE OF CORRECTION

PATENT NO. : 4,847,928
DATED : July 18, 1989
INVENTOR(S) : Hans Fey

It is certified that error appears in the above-identified patent and that said Letters Patent is hereby corrected as shown below:

Column 3, line 42, after "25" add --,--.

Signed and Sealed this

Thirty-first Day of July, 1990

Attest:

Attesting Officer

HARRY F. MANBECK, JR.

Commissioner of Patents and Trademarks